United States Patent [19]

Flatau

[11] 4,062,455
[45] Dec. 13, 1977

[54] REMOTE MANIPULATOR

[76] Inventor: Carl R. Flatau, 30 Dartmouth Road, Shoreham, N.Y. 11786

[21] Appl. No.: 743,962

[22] Filed: Nov. 22, 1976

[51] Int. Cl.² .............................................. B25J 3/00
[52] U.S. Cl. .............................. 214/1 CM; 214/1 BC; 214/1 BD; 74/710
[58] Field of Search ................... 214/1 B, 1 BS, 1 BC, 214/1 BH, 1 BD, 1 BV, 147 T, 1 CM, 1 R; 74/710

[56] References Cited

U.S. PATENT DOCUMENTS

| 3,826,383 | 7/1974 | Richter | 214/1 CM X |
| 3,922,930 | 12/1975 | Fletcher et al. | 214/1 CM X |
| 3,985,238 | 10/1976 | Nakura et al. | 214/1 CM |

FOREIGN PATENT DOCUMENTS

| 2,435,156 | 2/1976 | Germany | 214/1 CM |
| 1,441,999 | 7/1976 | United Kingdom | 214/1 CM |

*Primary Examiner*—Frank E. Werner
*Attorney, Agent, or Firm*—W. G. Fasse; W. W. Roberts

[57] ABSTRACT

A remote manipulator of the force reflecting servomaster-slave type comprises manipulator elements capable of at least seven distinct motions corresponding to respective degrees of freedom. The manipulator elements include an upper arm journalled in a shoulder assembly and a lower arm operatively connected to the upper arm by an elbow assembly. A gripping device such as a conventional tong is secured to the lower end of the lower arm through a wrist mechanism. Two cooperating motors establish an input output transmission through a differential gear system which permits two motions about axes extending perpendicularly to each other. One axis defines the longitudinal axis of the shoulder assembly. The other axis defines the longitudinal axis of the upper manipulator arm. The parallel drive shafts of the two motors transmit the drive power through parallel gear trains to the differential gear system, whereby coaxial shafts are avoided for the two motions. A third motor may be provided for a third motion, whereby the power transmission may extend through a hollow shaft, thus providing three motions, although using only one hollow shaft.

10 Claims, 6 Drawing Figures

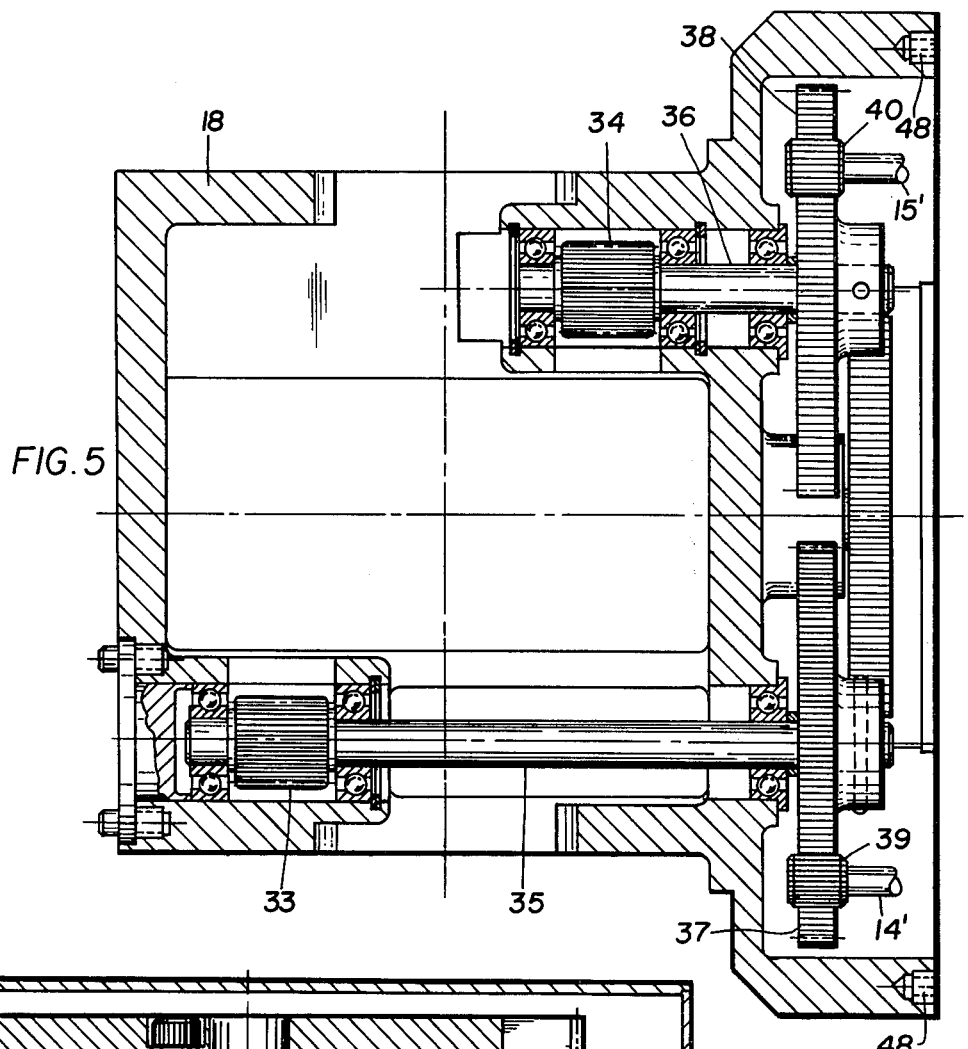
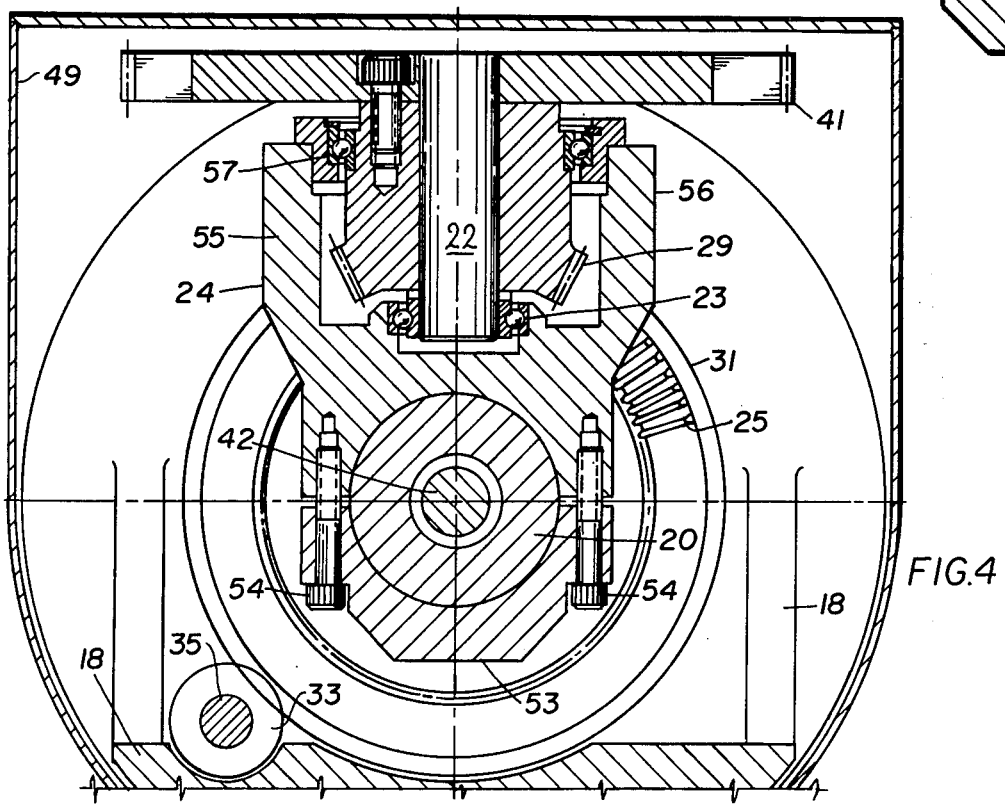

REMOTE MANIPULATOR

BACKGROUND OF THE INVENTION

This invention relates to a remote manipulator of the force reflecting servomaster-slave type having seven distinct degrees of freedom, whereby it is capable of carrying out seven distinct motions. More specifically, the present manipulator uses an apparatus for translating the power input of at least two parallel drive shafts into angular or rotational output motions around two respective axes extending at right angles to each other. For this purpose, a differential drive system is used for the two motions and a further independent drive may be used for a third motion.

To the extent described in the foregoing paragraph, the present invention utilizes the same prior art as the remote manipulator disclosed in U.S. Pat. No. 3,817,403 granted on June 18, 1974 to Glachet et al. In the known manipulator it is necessary to provide at least two concentric shafts in a concentric housing arranged coaxially with a central drive shaft. All these hollow shafts and drive shafts must be provided with bearings for rotation relative to each other. Such an arrangement is cumbersome to assemble and disassemble, whereby maintenance work is not facilitated. Besides, in spite of all the concentric shafts of the prior art device this known structure requires certain power transmission elements to extend unprotected from point to point which is undesirable because it tends to cause tangling of the cable or so-called "tapes" which are used for power transmission.

U.S. Pat. No. 3,790,002 granted on Feb. 5, 1974 to Germond et al discloses a manipulator in which a drive motor block produces a continuous balancing action. However, no differential gear drive mechanism is used in this prior art device.

Various other manipulators are disclosed in my previous U.S. Pat. Nos. 3,391,804 and 3,976,206 . These previous patents also do not involve a differential gear drive system.

The above mentioned seven distinct motions include the grasping motion of the tong and three motions referred to as the wrist motions and the further motions which permit the translation of the manipulator to any point in a three dimensional space to be covered by the manipulator. The last mentioned three motions may be rectilinear or rotational, however, the most common arrangement involves three rotational motions. The present invention is specifically concerned with the last mentioned three motions which are subject to certain problems not yet satisfactorily solved by the prior art.

OBJECTS OF THE INVENTION

In view of the above, it is the aim of the invention to achieve the following objects singly or in combination:

to drive at least two of the mentioned three motions through a differential gear system which does not require a concentric shaft arrangement;

to drive the three motions in such a manner that independent control in a servo mode of each motion is possible without the need for moving one or more of the drive motors and their housings, stated differently, the drive motors shall remain stationary in order to reduce inertia which otherwise might result due to the movements of motors and their housings;

to minimize any friction and inertia in the drive transmission trains and to minimize any inertia reflected to any power or motion output;

to provide a cooperating differential drive system for two output motions related to each other in an optimal manner as will be described in more detail below;

to construct the power transmission trains in such a manner that a compact overall configuration of the manipulator is achieved;

to arrange all the precision gears in a housing so that dirt and other contaminations will be kept out of the power transmission train;

to avoid bevel gears which are arranged concentric relative to the rotation of the upper arm of the manipulator about its own longitudinal axis, whereby smaller and hence less expensive gears may be used for that purpose;

to construct the manipulator arm, especially the upper arm thereof in such a manner that all transmission elements may be contained or housed in the manipulator arm; and to reduce the torque of the manipulator motor while simultaneously avoiding changing the gear ratio and nevertheless reducing reflected inertia.

SUMMARY OF THE INVENTION

According to the invention there is provided an apparatus for translating the power input of at least two parallel drive shafts into angular or rotational output motions around two respective axes which extend at a right angle to each other. The drive motors including said parallel drive shafts are supported in a frame. First motion output means are rotatably supported, for example, by bearings for rotation relative to the frame. Second motion output means are rotatably supported, for example, by second bearing means for rotation relative to the first motion output means. The first and second output means have respective first and second longitudinal axes which extend substantially at a right angle to each other. Differential gears including first and second bevel gears are rotatably supported relative to the first motion output means. A bevel pinion gear is rigidly secured to the second motion output means. First and second gear trains are operatively interposed between the parallel drive shafts and the respective bevel gears. The bevel pinion gear meshes with the first and second bevel gears, whereby rotation of the first and second bevel gears in the same direction rotates said first motion output means about its respective first longitudinal axis while simultaneously rotating the second motion output means also about said first longitudinal axis. Further, when the first and second bevel gears are rotated in opposite directions, the second motion output means is rotated about its own longitudinal axis.

The combination of the foregoing features as taught by the invention has several advantages, especially that a plurality of concentric shafts are avoided and that a most compact structure is accomplished while simultaneously maintaining all three motors stationary relative to the motion translation. The present very compact structure may be contained entirely in a housing to keep the high precision gear means free from contaminations such as dust or the like which would affect their precision movements. Another advantage of the invention is seen in that inertia effects are substantially reduced and that all power translating or transmitting elements such as tapes or the like may be contained in the tubular members of the manipulator.

BRIEF FIGURE DESCRIPTION

In order that the invention may be clearly understood, it will now be described, by way of example, with reference to the accompanying drawings, wherein:

FIG. 4 is a sectional view along the section line 4 — 4 in FIG. 2;

FIG. 5 is a sectional view along section line 5 — 5 in FIG. 2; and

DETAILED DESCRIPTION OF PREFERRED EXAMPLE EMBODIMENTS

Figure 1:
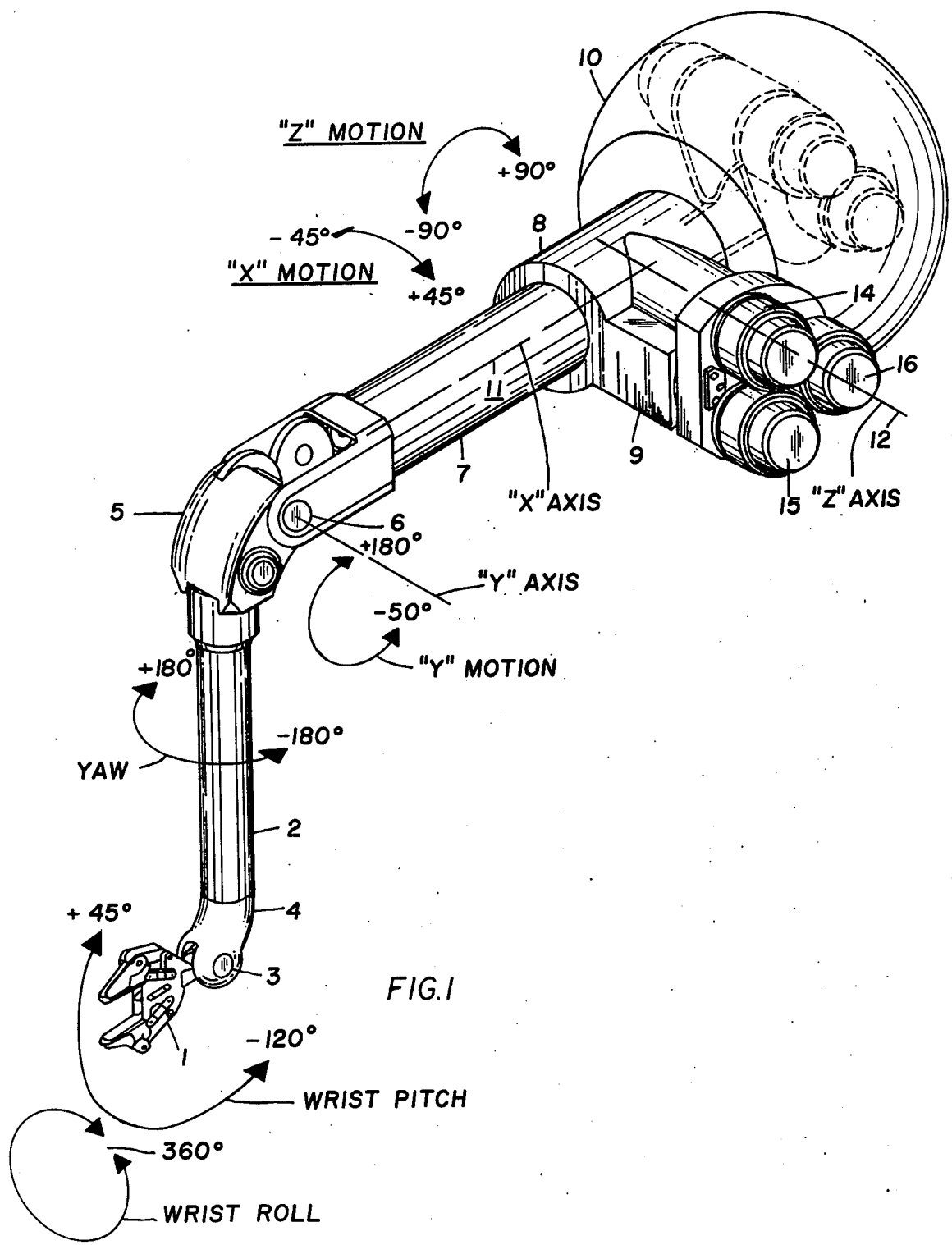
FIG. 1 shows, on a reduced scale, a perspective somewhat schematic view of the remote manipulator according to the invention and including a counterbalance assembly.

The perspective overall view of FIG. 1 is intended to generally illustrate a remote manipulator equipped with the differential gear drive system according to the invention. Such manipulators of the force reflecting servomaster-slave type normally comprise a tong unit 1 connected to the lower manipulator arm 2 by a wrist articulation pin 3 supported by a wrist yoke 4 which is mounted to the lower manipulator arm 2. An elbow assembly 5 includes an elbow pin 6 connecting said lower arm 2 to an upper arm 7 also referred to as the "X-rotation arm 7". The upper manipulator arm 7 is rotatably mounted in a shoulder assembly 8 attached to a shoulder differential drive assembly 9. The remote manipulator also includes a counterbalance assembly 10 mounted to the shoulder assembly 8 and carrying four motors which provide the power necessary for the above mentioned first four motions.

The first four motions as illustrated in FIG. 1 are as follows, the clamping of an object constitutes one degree of freedom and a respective clamping motion. The "roll" motion and the "pitch" motion of the wrist assembly 1 provide two additional degrees of freedom. The fourth degree of freedom provides the so-called "yaw" motion corresponding to a rotation of the lower manipulator arm 2 about its longitudinal axis. As mentioned, these four motions are driven by four motors contained in the counter balance assembly 10. The combined weight of said four motors counterbalances the upper arm structures 7, 8, and 9 and the lower arm structures 1 and 2 which is connected to the upper arm 7 by means of an elbow assembly 5. The transmission of the power from the four motors in the counterbalance assembly 10 to the lower arm 2, the wrist 4 and the tongue 1 may be accomplished in a conventional manner. Incidentally, the wrist tongue assembly is also prior art and may be purchased commercially as a shelf item.

The remaining three degrees of freedom are illustrated in FIG. 1 as the "X-motion", the "Y-motion", and the "Z-motion". The X-motion is a rotation about the longitudinal axis 11 of the upper manipulator arm 7. The Y-motion is a rotation substantially about the journal axis of the elbow pin 6. The Z-motion is a rotation substantially about the axis 12 through the drive assembly 9 as shown. The axis 12 constituting the Z-axis extends substantially at a right angle relative to the axis 11 which is the X-axis. The three motions must be mutually perpendicular to be effective for a translation in the three dimensional space. It is most common in this type of manipulator that all three motions X, Y and Z are rotational motions as illustrated.

The present invention comprises the shoulder differential drive assembly 9 which drives the just described three motions and which employs two cooperating motors for providing the X and Z motions. The invention takes advantage of the fact that these X and Z motions are always at right angles to each other so that they do not require a full torque in any possible position combination of the upper and lower manipulator arms 7 and 2 relative to each other. It is an advantage of the invention that in spite of the reduced torque any possible desired force vector output may be realized. This is so in the light of the following explanation. When the lower manipulator arm 2 extends substantially in parallel to the upper manipulator arm 7, the Z motion will have a maximum moment arm while the X motion will have a minimum moment arm. On the other hand, when the lower manipulator arm 2 extends substantially at a right angle relative to the upper manipulator arm 7, the Z motion will have a moment arm near its minimum while the X motion will have a maximum moment arm. Thus, the maximum combined torque of these two X and Z motions relative to the motor assembly may be as low as 1.2 times the individual maximum torque required for each motion. This result is surprising and an important advantage of the invention since it contrasts with the conventional situation, wherein the combined torque is two times the individual torque if the cooperating motor action as taught herein is not employed. Hence, the resulting practical advantage of the invention is seen in a reduced gear ratio which is about 1.67 times smaller than that which would be required if the two cooperating motors were connected without the cooperating action disclosed herein. Such an improved gear ratio results in an inertia reduction by $1.67^2 = 2.79$. This inertia reduction, when applied to the Z motion, substantially compensates for the inertia difficulties caused by a conventional torque capability sufficient to lift an object to be manipulated with the lower arm 2 into any desired position relative to the upper arm. This is so because of the following formula:

$$I_R = N^2/M^2$$

wherein $I_R$ corresponds to the reflected inertia, $N =$ the gear ratio between the pivot and the motor and wherein $M =$ the moment arm between the operation point and the pivot or journal point. Therefore, any reduction in the moment arm by a factor of 2 without changing the gear ratio would increase the inertia by a factor of 4. However, the invention avoids this inertia problem by combining the X and Z motions for cooperative action in the present differential gear drive assembly as taught by the invention and as will now be described in more detail.

Figure 2:
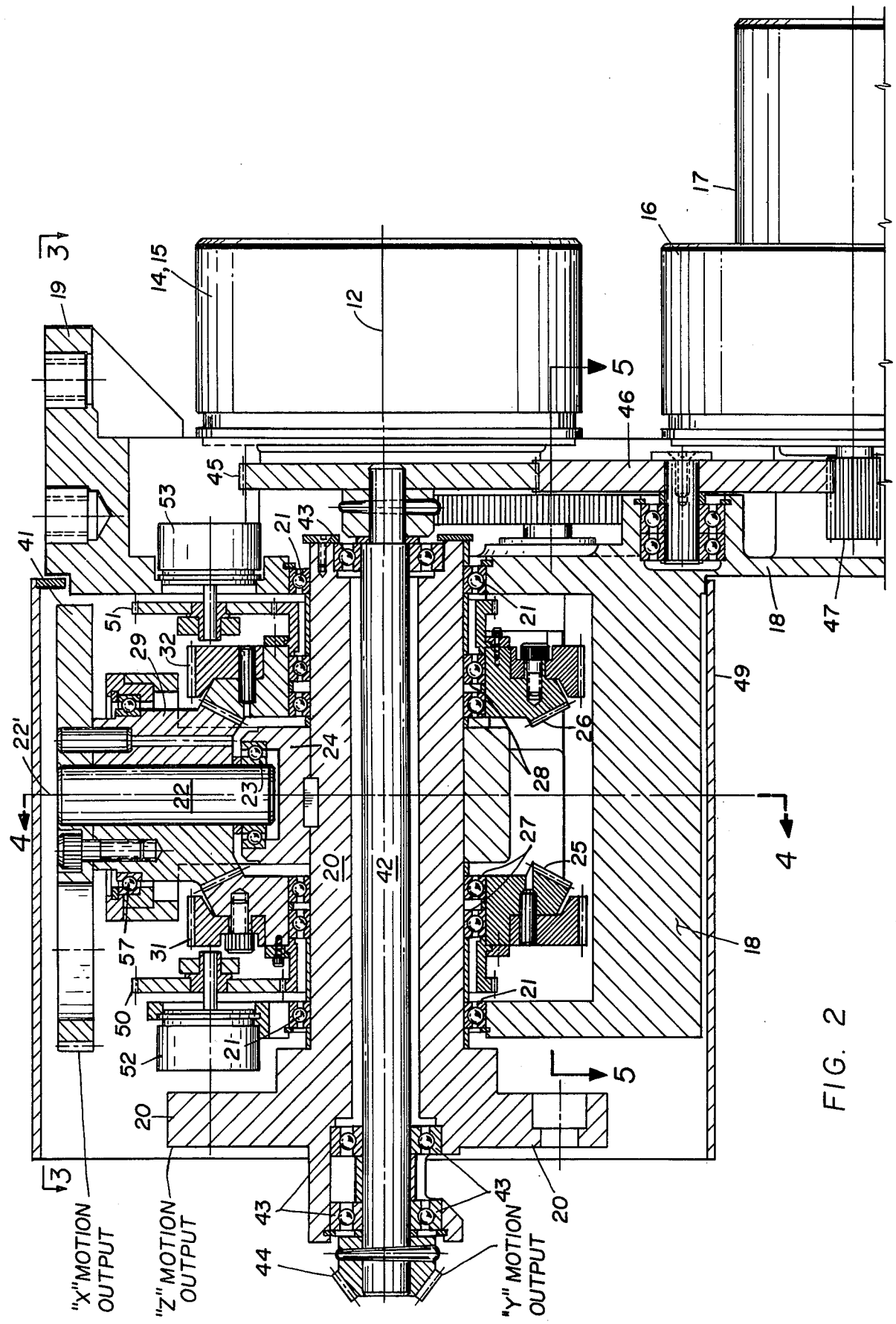
FIG. 2 is a sectional view through the shoulder differential drive assembly according to the invention substantially along section line 2 — 2 in FIG. 3.

Incidentally, the position of the motors 14, 15 and 16 shown in FIG. 1 does not correspond exactly to the position of the motors in FIG. 2. However, this is not relevant to the disclosure. The motors 14 and 15 cooperate in providing the X and Z motions. The motor 16 provides the y motion. FIG. 2 also shows a brake means 17 which will be provided in a slave system, but not necessarily in a master system. Otherwise the two systems would be of the same construction. The motors 14, 15 and 16 are secured to a frame structure 18 including a bracket 19 by means of which the entire arrangement may be secured to a support not shown.

The drive shafts 14' and 15' of the motors 14 and 15 extend in parallel to each other as best seen in FIG. 5. A first motion output member 20 is rotatably supported in the frame structure by means of bearings 21, whereby the first motion output member 20 which provides the z-motion may rotate relative to the frame 18.

Second motion output means 22 are rotatably secured to the first motion output member 20 by a bearing 23 held in a link member 24 keyed to the first output member 20. Thus, the second motion output member 22 may rotate about its own longitudinal axis 22' which extends at right angles to the rotational axis 12, the Z axis, of the first motion output member 20. In addition, according to the invention, the longitudinal axis 22' may rotate about the longitudinal axis 12 as will be described in more detail below. A differential gear drive system is included, according to the invention, in the drive train between the output shafts of the motors 14, 15 and the second output member 22. For this purpose, bevel gears 25 and 26 are rotatably supported on the first motion output member 20 by means of bearings 27 and 28. These bevel gears 25 and 26 mesh with a bevel pinion 29 rigidly secured to the second output member 22. The meshing contact between the bevel pinion 29 and the bevel gears 25 and 26 is assured because the bearing 23 takes up axial as well as radial forces.

Spur gears 31 and 32 are rigidly secured to the bevel gears 25 and 26, respectively. Thus these spur gears 31, 32 rotate with the bevel gears about the bearings 27, 28. The just mentioned spur gears 31 and 32 mesh with respective pinions 33 and 34 rigidly secured to respective axles 35 and 36. The axles 35 and 36 are supported by bearings in the frame structure 18 in a conventional manner. The axles 35 and 36 extend in parallel to each other, whereby the axle 36 is shorter than the axle 35 in order to locate the respective pinions 33 and 34 into positions permitting cooperation or meshing with the respective spur gears 31 and 32. Further spur gears 37 and 38 are rigidly secured to the free ends of the respective axles 35 and 36. Further pinions 39 and 40 are positioned on the parallel motor output shafts 14' and 15' respectively and mesh with the spur gears 37 and 38 for transmitting the output power of the motors 14 and 15 to the bevel gears 25 and 26 and thus to the bevel pinion 29 when the motors 14 and 15 rotate in opposite directions. On the other hand, when the motors 14 and 15 rotate in the same direction, the just described differential gear system provides a locking action, whereby the entire second output assembly 22 and the first output member 20 rotate in unison around the rotational axis or Z axis 12 of the first output member 20. The just described differential gear system and its cooperating action has the advantage that a plurality of concentric shafts are not necessary for performing the X and Z motions in planes extending perpendicularly to each other.

If desired, a third output motion may be provided by making the first output member 20 a hollow shaft as shown in FIG. 2, however, it should be emphasized again, that the hollow shaft is not necessary for providing the two output motions described above. As shown in FIG. 2 a drive shaft 42 is rotatably supported inside the first motion output member 20 by means of bearings 43. A bevel spur gear 44 is secured in a force transmitting manner to the left hand end of the shaft 42. Similarly a spur gear 45 is secured in a force transmitting manner to the right hand of the shaft 42. The spur gear 45 meshes with a further spur gear 46 which in turn is driven by a pinion 47 on the output shaft of the motor 16. Thus, the Y motion output is independent of the above described X and Z motion output.

Incidentally, the motors 14, 15 and 16 may be secured to the frame structure 18 by means of screws not shown. However, the screw holes 48 are shown in the facing end of the frame structure 18 in FIG. 5.

Figure 3:
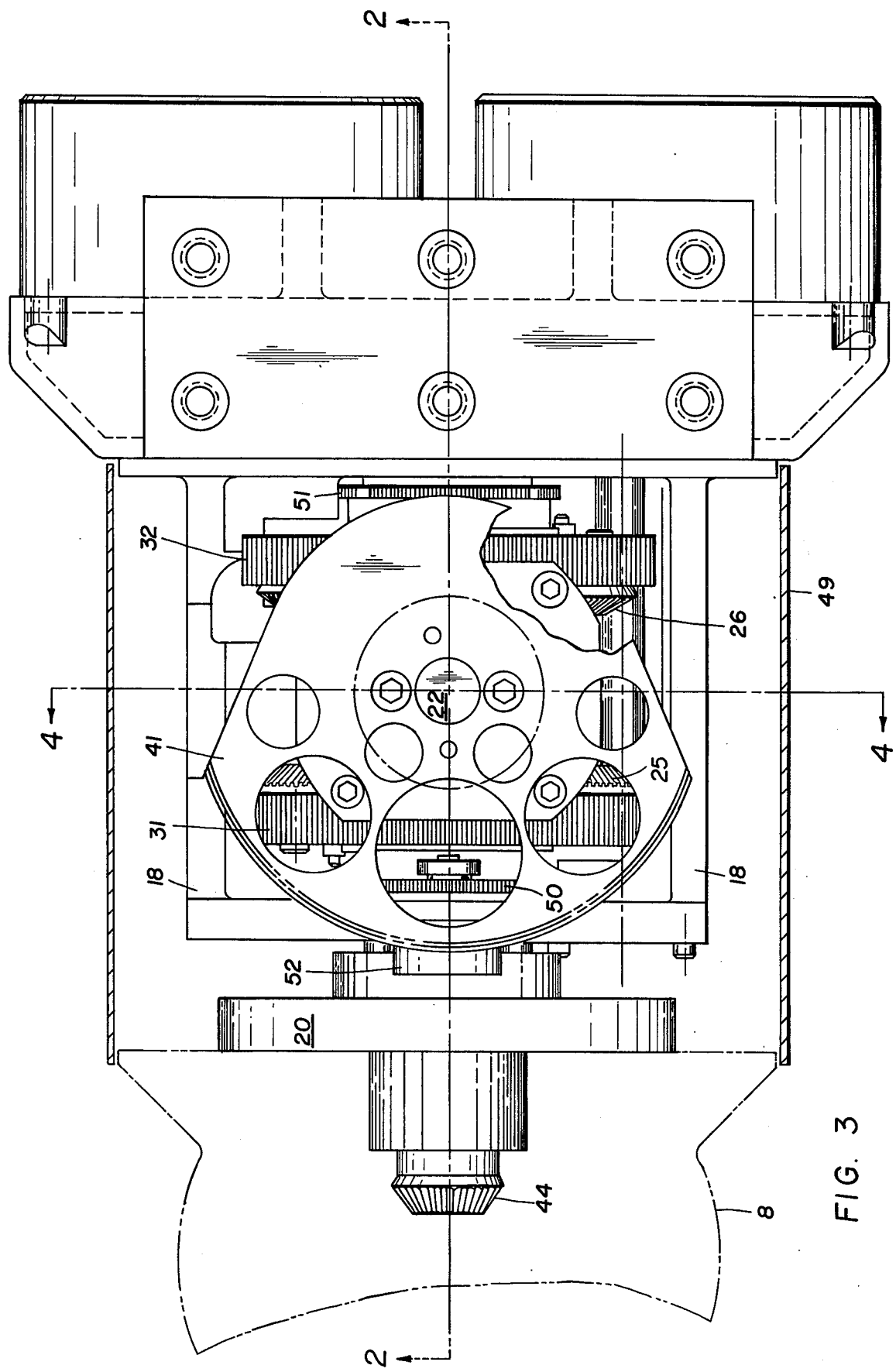
FIG. 3 is a view substantially along section lines 3 — 3 in FIG. 2.

A housing 49 surrounds the entire differential gear drive assembly as shown in FIG. 2 as well as in FIGS. 3 and 4. The housing 49 is rotatable relative to the frame structure 18. The same reference numbers designate in FIGS. 3 and 4 the same elements as in FIG. 2. Gear means 50 and 51 are arranged in a force transmitting manner relative to the spur gears 31, 32 and bevel gears 25 and 26, respectively for driving potentiometers 52 and 53 for control purposes in a manner known as such.

Referring to FIG. 4 there are shown in more detail the features of the link member 24 which is secured with its lower end to the first motion output member 20 by a clamping member 53 and screws 54. The link member 24 has two spaced legs 55 and 56 which receive therebetween the second output assembly 22 including the spur gear pinion 29 and the bearing 23, also shown in FIG. 2. The second output assembly 22 is supported by a further bearing 57, whereby the gear segment 41 which is rigidly secured to the second motion output 22 is held in position for meshing contact with a further gear segment 58 shown in FIG. 6.

Figure 6:
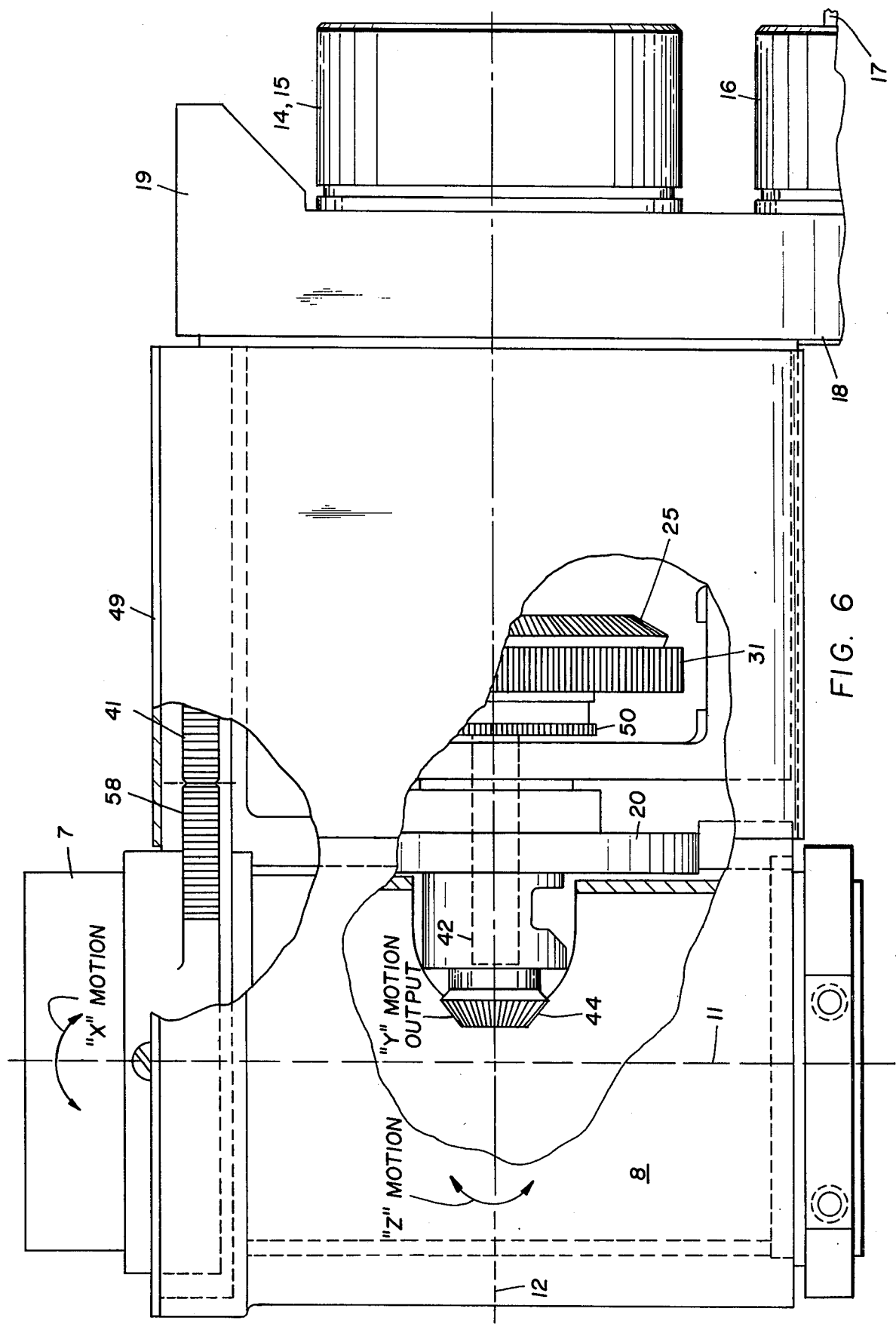
FIG. 6 is an elevational side view of the arrangement of the arm housing as well as of the shoulder housing with parts of the housing walls broken away to show the internal position of the various motion translating means.

The gear segment 58 forms part of the upper manipulator arm 7 which is rotatably supported in the arm housing assembly 8 as best seen in FIG. 6.

Summarizing, the invention minimizes inertia and the problems resulting therefrom. The invention provides a compact, remote manipulator which requires but one concentric shaft for three output motions. Moreover, the present structure is amenable to a complete enclosure, thereby avoiding the exposure of the precision gears to dirt and other contaminating particles. Bevel gears concentric with the X motion are completely avoided, whereby smaller and less expensive gears may be employed. Simultaneously, the diameter of the arm of the remote manipulator may be increased permitting to contain all the power transmission elements inside the manipulator itself, whereby tangling of the drive tapes and contamination are avoided.

Although the invention has been described with reference to specific example embodiments, it is to be understood that it is intended to cover all modifications and equivalents within the scope of the appended claims.

What is claimed is:

1. An apparatus for translating the power input of at least two parallel drive shafts into angular or rotational output motions around two respective axes which extend at a right angle to each other, comprising drive means including said parallel drive shafts, frame means supporting said drive means, first motion output means, first bearing means rotatably supporting said first motion output means relative to said frame means, second motion output means, second bearing means rotatably securing said second motion output means to said first motion output means, said first and second motion output means having respective first and second longitudinal axes extending substantially at a right angle relative to each other, differential gear means including first and second bevel gears rotatably supported relative to said first motion output means and a bevel pinion gear rigidly secured to said second motion output means, first gear train means operatively interposed between one of said parallel drive shafts and said first bevel gear, second gear train means operatively interposed between the other of said parallel drive shafts and said second bevel gear, said bevel pinion gear meshing with said first and second bevel gear whereby rotation of said first and second bevel gears in the same direction rotates said first motion output means about its respective first longitudinal axis while simultaneously rotating the second motion output means also about said first longitudinal axis, and whereby rotation of said first and second bevel gears in opposite directions rotates said second motion output means about its own longitudinal axis.

2. The apparatus of claim 1, further comprising housing means substantially enclosing said frame means, said differential gear means and said first and second gear train means as well as said first and second motion output means.

3. The apparatus of claim 1, further comprising a third drive shaft and respective drive means also supported by said frame means, said third drive shaft also extending in parallel to said two parallel drive shafts, said first motion output means comprising hollow shaft means, third motion output means rotatably supported in said hollow shaft means, third gear train means operatively interposed between said third drive shaft and said third motion output means.

4. The apparatus of claim 3, further comprising arm housing means operatively connected to said first motion output means for rotation about said first longitudinal axis, upper arm means having a longitudinal arm axis, said upper arm means being rotatably supported in said arm housing means and operatively connected to said second motion output means for rotation about said longitudinal arm axis, lower arm means, elbow means operatively interconnecting said upper and lower arm means, motion translation means in said upper arm means and operatively interposed between said third motion output means and said lower arm means, wrist means operatively secured to said lower arm means, tong means secured to said wrist means, and drive means operatively connected through said upper and lower arm means to said wrist means and to said tong means for performing remote controlled manipulator operations.

5. The apparatus of claim 1, wherein said first motion output means comprise a rotatable member rotatably supported in said frame means, wherein said second motion output means comprise a stud member having upper and lower ends, said bevel pinion gear being rigidly secured to said stud member intermediate the ends thereof, link means operatively interconnecting said first motion output means and said second motion output means, said link means having a lower end rigidly secured to said rotatable member of the first motion output means, and two spaced upper arms rotatably connected to said bevel pinion gear, bearing means operatively interposed between the lower end of said stud member and said link means intermediate said spaced upper arms of said link means, and gear segment means rigidly secured to the upper end of said stud member.

6. The apparatus of claim 5, further comprising upper manipulator arm means, arm housing means, bearing means rotatably supporting said upper manipulator arm means in said arm housing means, further gear segment means rigidly secured to said upper manipulator arm means for cooperation with said first mentioned gear segment means for translating the operation of said second motion output means to thereby rotate said upper manipulator arm means about its own longitudinal axis, and means operatively connecting said rotatable member of said first motion output means to said arm housing means whereby the latter may be rotated about said first longitudinal axis extending perpendicularly to said longitudinal axis of said upper manipulator arm means.

7. The apparatus of claim 1, further comprising manipulator arm means including arm housing means at the upper end of said manipulator arm means, and further housing means substantially enclosing said differential gear means, said further housing means extending substantially at a right angle of said arm housing means and to one side of said arm housing means.

8. The apparatus of claim 1, wherein said first and second gear train means are arranged in parallel to said first motion output means whereby coaxial shaft means for said first and second motion output means are avoided.

9. The apparatus of claim 8, wherein each of said first and second gear train means comprise first pinion means on said parallel drive shafts, parallel axle means rotatably supported in said frame means, first spur gear means keyed to said parallel axle means at one end thereof for cooperation with said first pinion means, second pinion means secured to the opposite end of each axle means, and second spur gear means rigidly secured to said first and second bevel gears and positioned for meshing cooperation with said second pinion means.

10. The apparatus of claim 9, wherein said parallel axle means comprise a short axle and a long axle whereby said second pinion means are spaced for cooperation with said second spur gear means rigidly secured to said first and second bevel gears.

* * * * *